Feb. 24, 1953  H. F. RUNKLE  2,629,201
COMBINATION MINNOW BUCKET AND TRAP
Filed Feb. 28, 1949

INVENTOR.
Harry F. Runkle
BY
ATTORNEY.

Patented Feb. 24, 1953

2,629,201

UNITED STATES PATENT OFFICE 2,629,201

COMBINATION MINNOW BUCKET AND TRAP

Harry F. Runkle, Kansas City, Kans.

Application February 28, 1949, Serial No. 78,873

1 Claim. (Cl. 43—100)

This invention relates to fishing equipment and more particularly to a combination minnow bucket and trap, the primary object being to provide an improved gate normally closing an opening formed in the bucket through which the minnow passes, the gate being provided with means for rendering the same buoyant in water to the end that as the device is placed in water, the gate will automatically open and again close automatically when the bucket is removed from the water.

It is the most important object of the present invention to provide a fish trap having a hollow bucket-like body provided with at least one opening in the side thereof, that is covered by a swingable gate on the innermost face of the bucket, swingably mounted thereon and normally hanging by force of gravity in closed relationship to the opening, the gate being additionally supplied with a cork for rendering the entire gate buoyant in water, whereby, as the bucket is placed in a stream or lake, the opening will admit minnows and other small fish, and further whereby, as the bucket is raised from the stream, the gate will automatically close and trap the minnows therein.

Other objects of the present invention relate to the way in which the bucket opening is permanently closed, either by a latch on the gate itself or through the medium of a secondary door; the way in which the bucket is made almost entirely from foraminous material and provided with an access opening in the top thereof; and the manner in which the foraminous bucket is used in connection with an outer bucket adapted to contain water, all to the end that the entire device can be used both as a trap and as a bait box.

Other more minor objects including details of construction, will be made clear or become apparent as the following specification progresses, reference being had to the accompanying drawing, wherein.

It is appreciated that bait boxes, fish traps and the like have heretofore been developed, but so far as I am aware, in each case, the conventional fish trap is not so formed as to permit use thereof after the same serves its purpose as a trap in preserving the fish that have been trapped thereby, whereby the same can also be used as a bait bucket. Such is the primary object of the device about to be described, and it will be seen that such advantageous result is obtained through use of the novel gate structure forming a part of the bucket.

Figure 1:
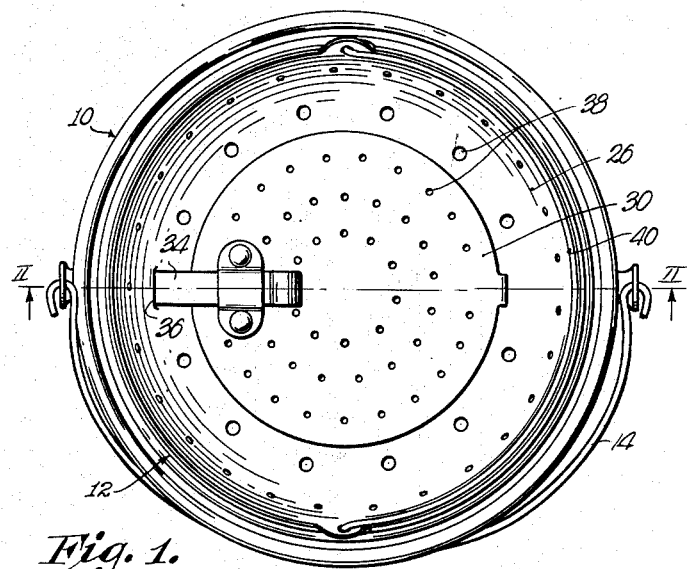
Fig. 1 is a top plan view of one form of combination minnow bucket and trap made in accordance with my present invention.
Figure 3:
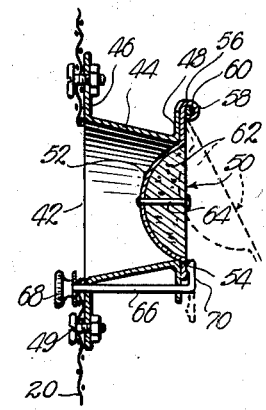
Fig. 3 is a transverse cross-sectional view taken on line III—III of Fig. 2.
Figure 2:
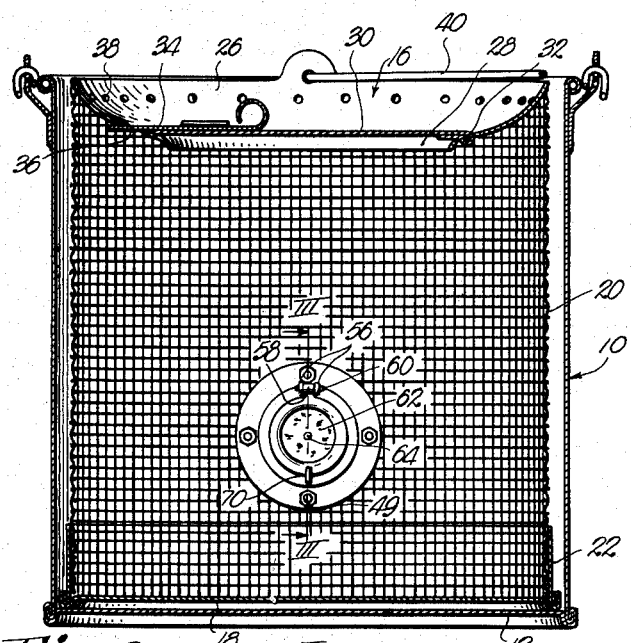
Fig. 2 is a substantially central vertical cross-sectional view taken on line II—II of Fig. 1, and looking in the direction of the arrows.

In Figs. 1 to 3 inclusive of the drawing, there is illustrated one form of my present invention and in Figs. 1 and 2, the numeral 10 designates broadly an outer bucket of any conventional character, preferably cylindrical, and provided with a solid bottom 12.

The top of bucket 10 is open and a bail 14 is swingably secured to the side walls of bucket 10 for convenience in use. Bucket 10 is formed to receive easily and loosely a second inner bucket, broadly designated by the numeral 16.

Bucket 16 has a bottom wall 18 that rests directly upon the innermost face of the wall 12 of bucket 10 and a cylindrical side wall 20, preferably formed from wire mesh or other foraminous material. It is to be noted, that for purposes of rigidity, there is provided a band 22 around the bucket 16 adjacent the bottom wall 18 and connected thereto.

A dish-like top wall 26 is provided for the bucket 16, having an access opening 28 formed therein and covered by a lid 30 that is hinged thereto as at 32. The lid 30 has a latch 34 that passes through a slot 36 formed in the top 26, all to the end that upon manipulation of latch 34, the lid 30 may be swung to an open position and will permit the user to insert his hand into the bucket to reach the bait therein. It is to be noted that the wall 26 and its lid 30, are also provided with a plurality of perforations 38 and that the periphery of the wall 26 is secured directly to the uppermost edge of the foraminous wall 20 in any suitable manner such as by soldering or use of suitable fastening elements.

It is to be noted at this point that the particular formation of the buckets 10 and 16 as just above described, is of no particular importance to the present invention and may be varied to suit the desires of the user. To this end, the entire bucket 16 may be made of foraminous material if desired, but in any event there should be provided a bail 40 on the bucket 16, to permit easy removal thereof from within the confines of bucket 10 and to aid in the use thereof as a trap.

One or more openings 42 are provided in the foraminous wall 20 of bucket 16 and it is contemplated that there should be at least a pair of diametrically opposed openings 42 provided. A frusto-conical tubular member 44, provided with opposed out-turned annular flanges 46 and 48, is secured directly to the innermost face of the foraminous wall 20 through use of bolts or other fastening elements 49. These fastening means 49 pass through the wall 20 and through the out-turned flange 46 of tubular member 44 as illustrated in Fig. 3 and as shown in this figure, flange 46 circumscribes the opening 42 and positions the tubular member 44 coaxially with the opening 42.

A gate or door, broadly designated by the numeral 50, is secured to the member 44 in a position where gate 50 will normally close the innermost end of member 44 in the manner illustrated in full lines in Fig. 3. Gate 50 includes a hollow, semi-spherical portion 52 provided with a continuous annular out-turned flange 54 at its periphery.

A pair of inwardly projecting ears 56 is formed on the flange 48 at the top thereof and the flange 54 of gate 50 is provided with a loop 58 disposed between the ears 56 as shown in Fig. 2 for rotatably receiving a hinge pin 60 that interconnects the ears 56. The diameter of the portion 52 of gate 50 is substantially the same as the diameter of the member 44 at the innermost end thereof, all to the end that when gate 50 is in the closed position, all of the portion 52 thereof is confined within the frusto-conical tubular member 44. When gate 50 is in the closed position shown by full lines in Fig. 3, the flange portion 54 thereof, lies flatly against the innermost face of flange 48 of member 44.

A semi-spherical filling 62, made from cork or other material capable of rendering the entire gate 50 buoyant, is disposed within the portion 52 of the gate 50 and held in position therein by a pin or rivet 64 passing through the cork 62 and through the portion 52 of gate 50. A latch for releasably holding the gate 50 in the closed position, shown by full lines in Fig. 3, includes an L-shaped rod 66 that passes rotatably through the wall 20 of bucket 16 and through the flanges 46 and 48 of the member 44.

A manually operable button 68 on the outermost end of the rod 66, permits the rotation of the latter to the end that the short leg 70 of rod 66 may be swung to and from a position bearing against the flange 54 of gate 50 at a point diametrically opposed to hinge pin 60.

When the device is placed in use, bucket 16 is removed from the bucket 10 and through use of the bail 40, bucket 16 is lowered into the water for the purpose of trapping relatively small fish such as minnows to be used as bait. Immediately upon such immersion of the bucket 16 into the water, gate 50 will swing toward the open position indicated by dotted lines in Fig. 3 whenever the latch rod 66 is unlocked. The cork filling 62 lends sufficient buoyancy to the entire gate 50 to cause the latter to swing fully to the open position. All the while bucket 16 is within the water, all of the gates 50 that are provided within wall 20 will remain in the open position and the fish will enter openings 42, pass through the tubular members 44 and be trapped within the confines of bucket 16. When the user raises the bucket 16 and removes the same from the waters, gate 50 will swing by force of gravity, to a position closing the member 44, whereupon gate 50 can be locked in place by manipulating rod 66.

Figure 5:
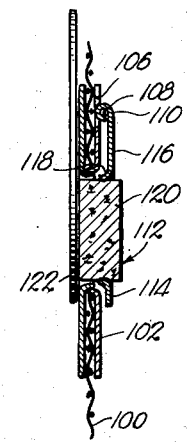
Fig. 5 is a transverse cross-sectional view taken on line V—V of Fig. 4.
Figure 4:
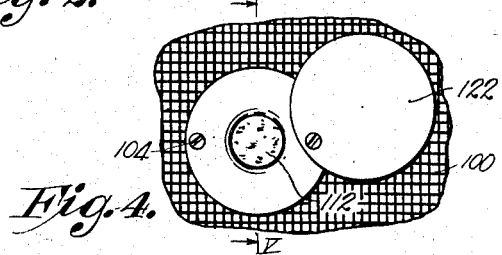
Fig. 4 is a fragmentary side elevational view showing a modified form of my present invention.

In the form of my invention illustrated in Figs. 4 and 5, the form of buckets 10 and 16 may be the same as above described and illustrated in Figs. 1 and 2. Such inner bucket 16 will likewise be provided with a foraminous side wall 100, having one or more openings provided therein and defined by a grommet 102, that is U-shaped in cross-section as shown in Fig. 5 and secured directly to wall 100 through use of bolts or other fastening elements 104. The innermost flange of the grommet 102, has a slot 106 at the uppermost edge thereof that is bridged by a cross pin 108 for pivotally receiving a loop 110 forming a part of a gate, broadly designated by the numeral 112.

Gate 112 includes a washer-like member 114 having an upwardly extending ear 116 upon the uppermost end whereof is formed the aforesaid loop 110. Member 114 is provided with an inturned annular flange 118, and a disc-shaped cork 120 is mounted within the washer member 114 and through press-fit held in place therein. The outside diameter of the cork 120 is substantially the same as the diameter of the opening through grommet 102 to the end that when gate 112 is in the closed position illustrated in Figs. 4 and 5, cork 120 will enter grommet 102.

The operation of the modification shown in Figs. 4 and 5 is the same as that of Figs. 1 to 3 inclusive and need not be repeated. However, in lieu of the use of the locking means for holding gate 112 in the closed position, there is provided a disc 122 on the outermost face of the wall 100 swingably secured to one of the fastening elements 104, as shown in Fig. 4, all to the end that when the foraminous bucket is raised from the water, the opening through grommet 102 may be closed by swinging disc 122 to the closed position. A relatively tight fit is provided between disc 122 and its fastening element 104 and furthermore, as disc 122 covers the other fastening element 104, the same will remain in the closed position.

It is apparent from the foregoing that in either of the two modifications disclosed and described, after the innermost foraminous basket or trap is raised from the water with fish therein, the user can place the same within the outer bucket 10 and by filling the latter with water, can keep the bait alive and can remove the same as used through opening of the lid 30.

Manifestly, the present invention may take many forms in addition to the two modifications herein disclosed, and those changes and modifications as fairly come within the scope of the appended claims, are contemplated hereby.

Having thus described the invention, I claim:

In a fish trap, a hollow body having an opening in one wall thereof; a frusto-conical, tubular member in the body having a large end and a small end, and a pair of spaced, out-turned, annular flanges, the flange proximal to said large end of the member engaging the inner face of said wall and being secured thereto, said member being aligned with said opening; a gate for said member including a hollow, semi-spherical portion adapted to fit into the member at said small end thereof; a continuous out-turned, annular flange on said portion of the gate bearing against the other of said flanges of the member when said portion is within the member; means hingedly securing the flange of said portion of the gate to said other flange of the member; a latch including an L-shaped rod having one leg thereof rotatably mounted in said flanges of the member and a second leg adapted to bear against the flange of said portion of the gate for holding the gate closed; an operating button on said one leg exteriorly of the body for rotating the latch; and a semi-spherical cork filling secured within said portion of the gate for rendering the gate buoyant in water when the gate is unlatched.

HARRY F. RUNKLE.

REFERENCES CITED

The following references are of record in the file of this patent:

UNITED STATES PATENTS

| Number | Name | Date |
| --- | --- | --- |
| 171,446 | Sullivan | Dec. 21, 1875 |
| 194,253 | Lasater | Aug. 14, 1877 |
| 302,161 | Rudolph | July 15, 1884 |
| 616,924 | Heberling | Jan. 3, 1899 |
| 710,020 | Short | Sept. 30, 1902 |
| 1,446,609 | Baylor | Feb. 27, 1923 |
| 1,607,443 | Cormier | Nov. 16, 1926 |
| 2,539,412 | Faris | Jan. 30, 1951 |